United States Patent [19]
Belden, Jr. et al.

[11] Patent Number: 5,762,187
[45] Date of Patent: Jun. 9, 1998

[54] SECURITY CONTAINER

[75] Inventors: Dennis D. Belden, Jr.; James A. McGill, both of Canton, Ohio

[73] Assignee: Alpha Enterprises, Inc., North Canton, Ohio

[21] Appl. No.: 906,521

[22] Filed: Aug. 5, 1997

[51] Int. Cl.$^6$ ................................................ B65D 85/30
[52] U.S. Cl. .......................... 206/308.2; 206/387.11; 206/1.5
[58] Field of Search ................ 206/387.11, 308.2, 206/307, 1.5, 807; 70/63

[56] References Cited

U.S. PATENT DOCUMENTS

| | | | |
|---|---|---|---|
| 4,805,769 | 2/1989 | Soltis et al. | 206/308.2 |
| 5,147,034 | 9/1992 | Broadhead et al. | 206/1.5 |
| 5,209,086 | 5/1993 | Bruhwiler | 70/57.1 |
| 5,368,162 | 11/1994 | Holmgren | 206/387 |
| 5,375,712 | 12/1994 | Weisburn | 206/387 |
| 5,598,728 | 2/1997 | Lax | 70/276 |
| 5,636,535 | 6/1997 | Shimada | 206/387.11 |

*Primary Examiner*—Jacob K. Ackun
*Attorney, Agent, or Firm*—Sand & Sebolt

[57] ABSTRACT

A security container for storing various articles such as recorded media, includes a parallelipipedic frame with an internal storage chamber and an access opening communicating therewith. A slide plate is slidably mounted on one end of the frame and is movable linearly toward and away from the access opening. A separate tab is slidably mounted on the frame adjacent the access opening and is automatically moved linearly in a direction perpendicularly to the linear movement of the slide plate between a blocking position across the access opening and an unblocking position by a camming engagement with the slide plate. A lock mechanism releasably locks the slide plate in a fixed position to retain the tab in the blocking position until released by a key device.

20 Claims, 6 Drawing Sheets

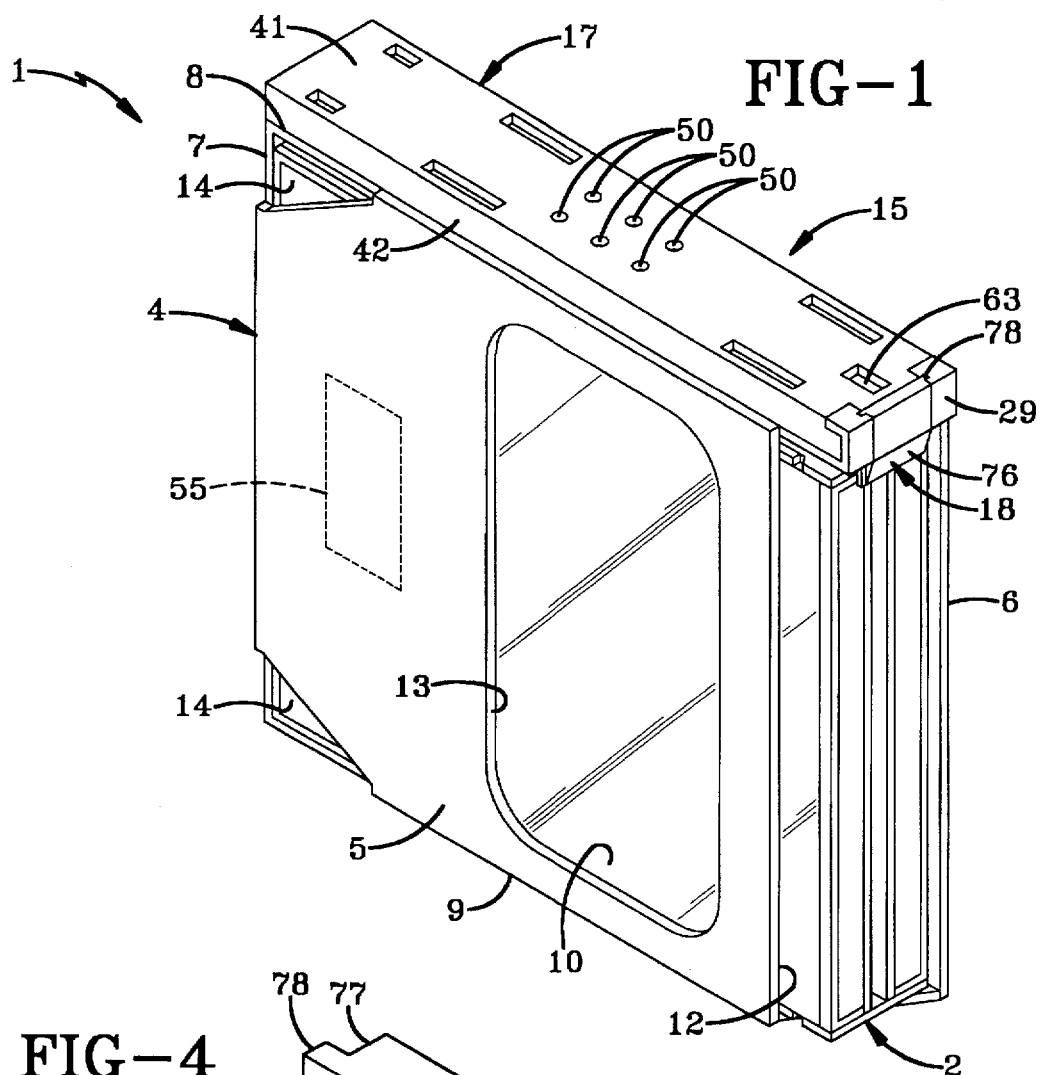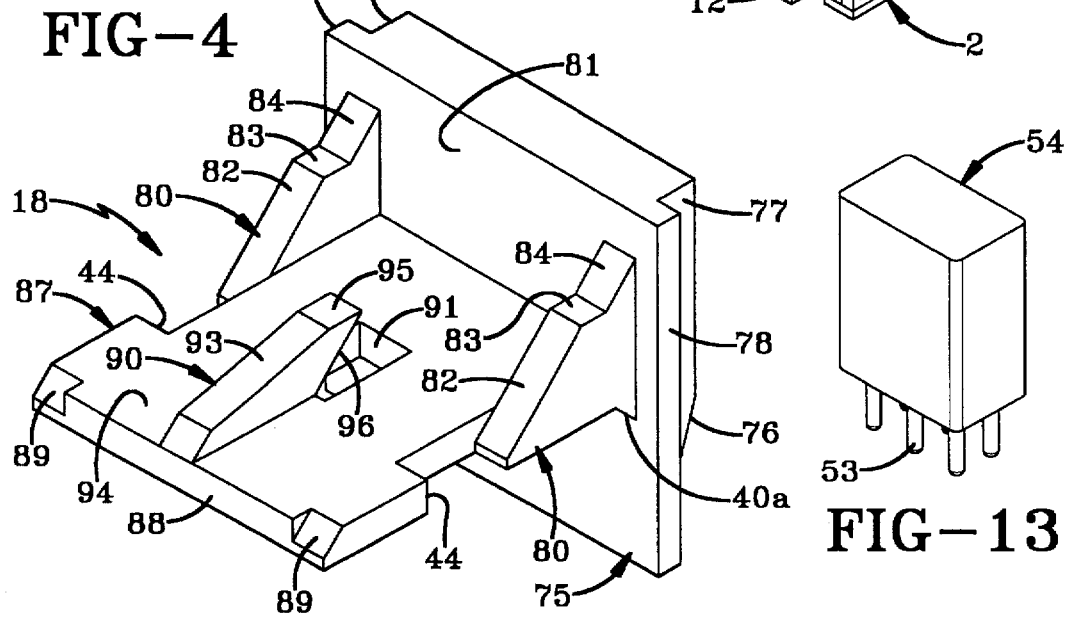

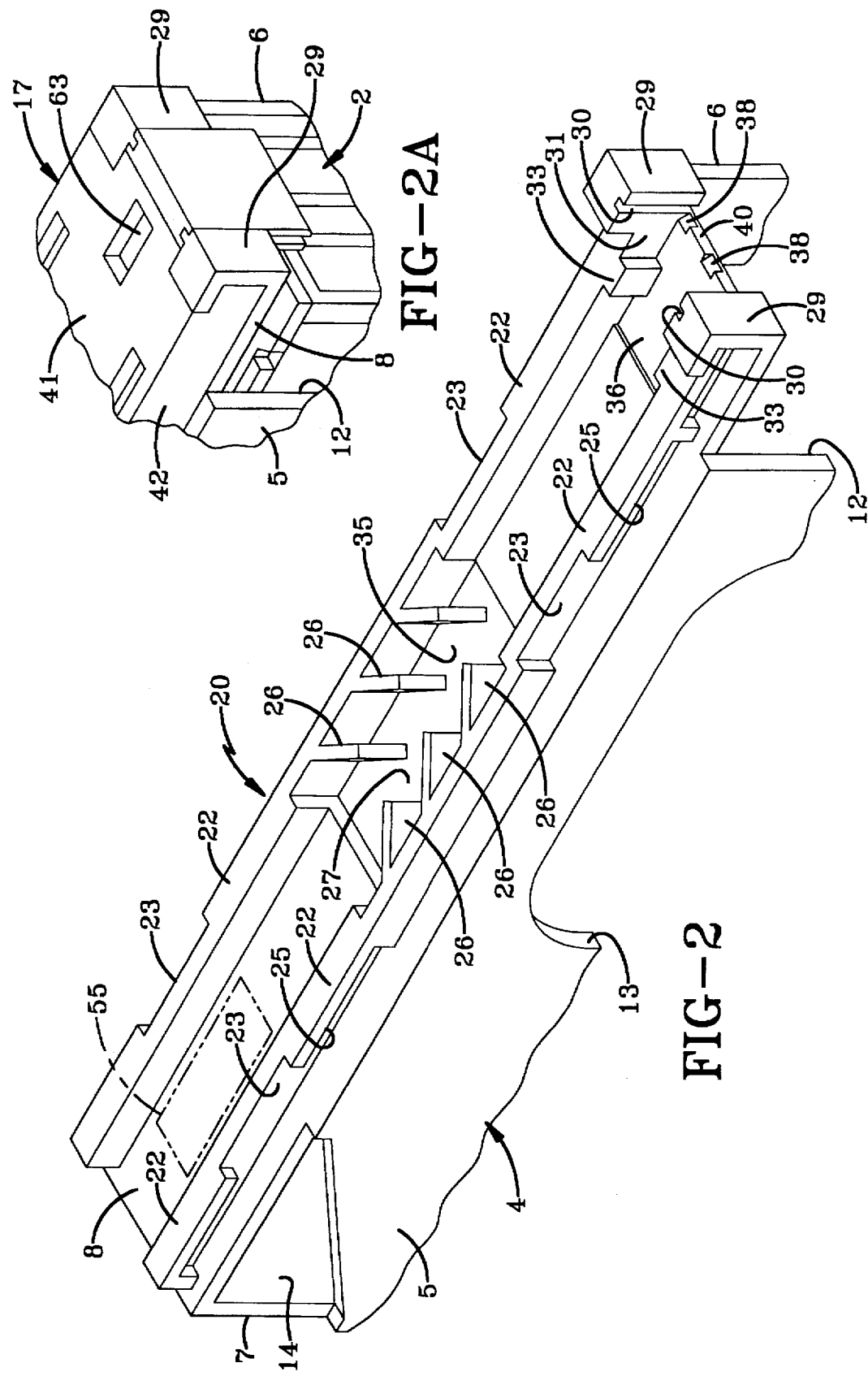

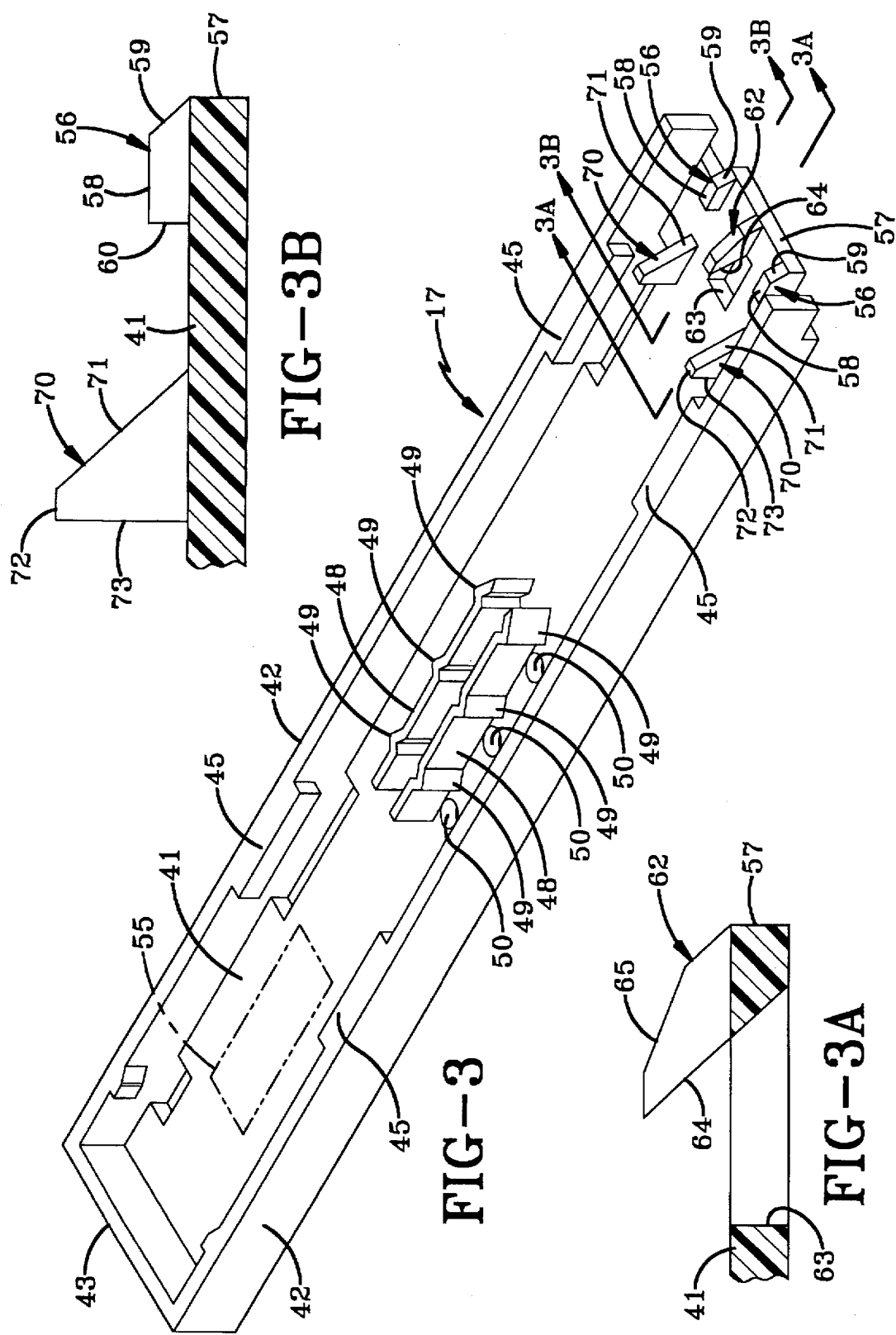

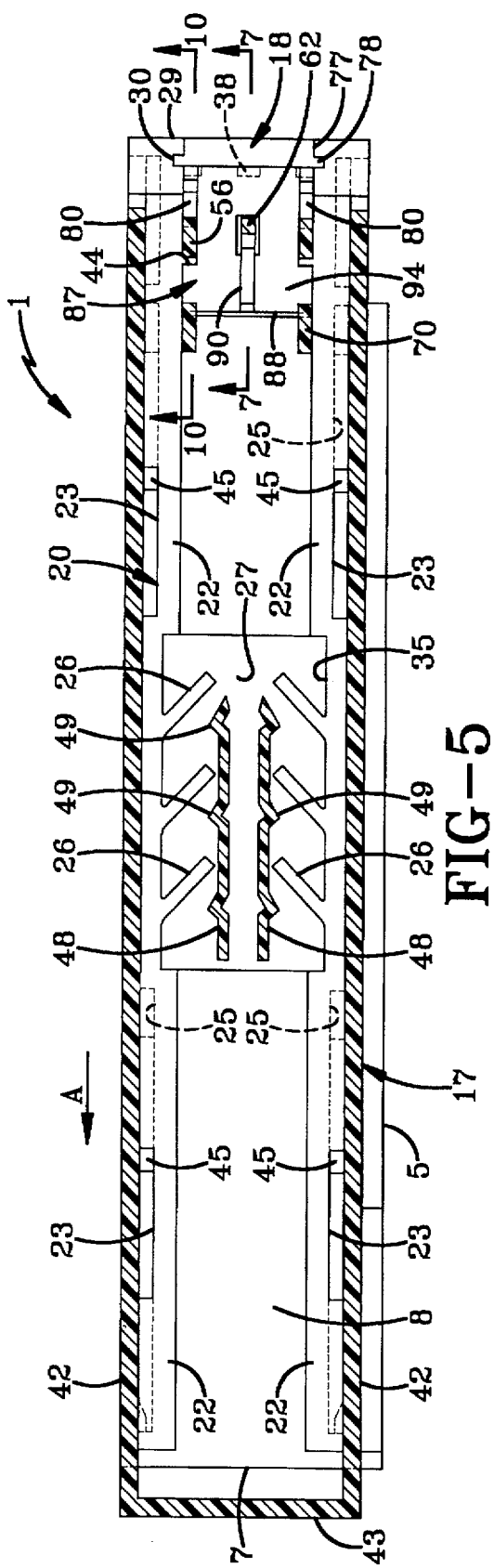
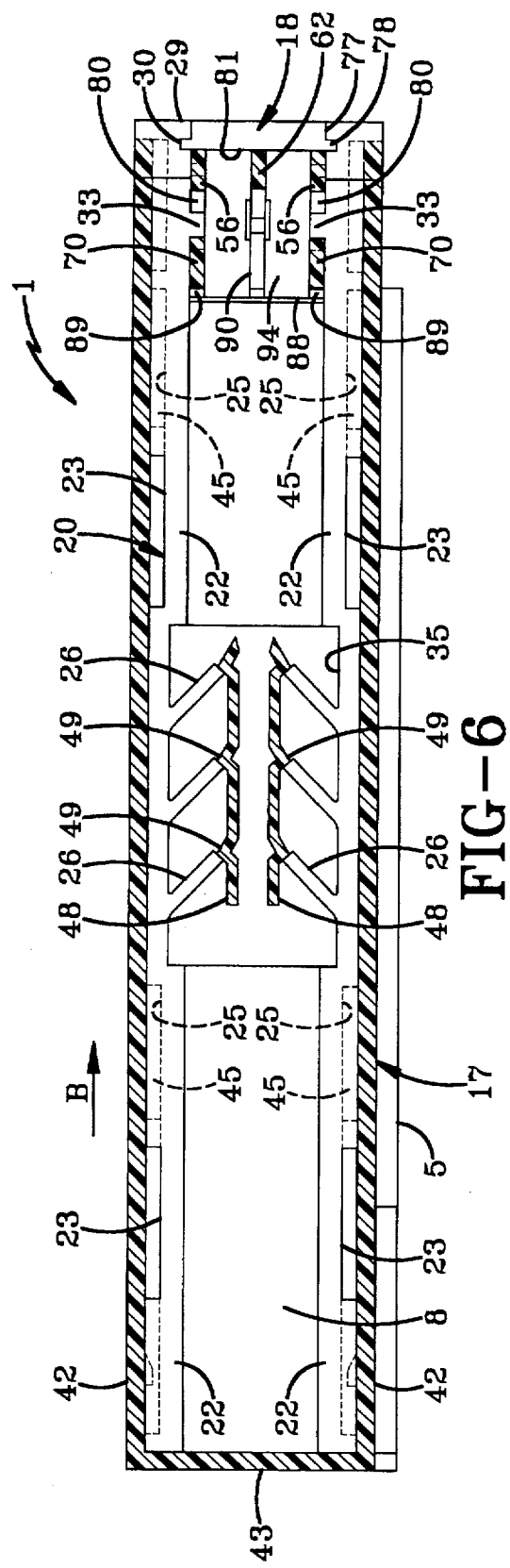

SECURITY CONTAINER

BACKGROUND OF THE INVENTION

1. Technical Field

The invention relates to containers and in particular to a container for storing various articles such as video and audio cassettes, compact discs, video games, software and other recorded media. More particularly, the invention relates to such a storage container which can be securely locked in a closed position preventing the unauthorized removal of the contents therefrom until a store clerk or owner of the container unlocks the container by a key device.

2. Background Information

Containers, and in particular, lightweight inexpensively molded plastic containers, are used for a variety of purposes including the storage of various articles. One use of such plastic containers is for the storage of video and audio cassettes, and other recorded media, for both display and sale, as well as for home storage. One particular use of such plastic storage containers, which preferably are formed of a transparent material, is the display of such recorded media at a retail store. However, it is desirable that the container be locked to prevent the unauthorized removal of the article therefrom, thereby preventing the unauthorized removal from the store. Many of these containers will contain an E.A.S. tag (electronic article surveillance) located inside the container which will sound an alarm should the thief attempt to remove the container and stored media from the store past a security check point.

The present invention provides an inexpensive plastic case for storing various articles, such as video and audio cassettes, various software etc., which will be contained in a secured locked position preventing the unauthorized removal of the article, E.A.S. tag or other object from the within the security container, until the container has been unlocked and opened by authorized personnel.

Various containers for storing articles including recorded media, have been provided with various types of locking mechanisms some of which include a locking tab which extends only partially over an access opening of the storage compartment of the container. Examples of these locking mechanisms which are believed to be the ones most closely related to that of the present invention are shown in U.S. Pat. Nos. 5,147,034; 5,209,086; 5,368,162; 5,588,315 and 5,598,728. All of these mechanisms use various types of sliding and pivoting tabs and combinations thereof, which although may perform satisfactory, require complicated and expensive structures and are more difficult to operate than desirable requiring at least two motions to move the blocking tab out of its blocking location in front of the access opening. Certain others of these prior art devices require springs which bias certain of the members towards or away from the locking position, again increasing the cost and complexity of the container, which preferably is of a relatively rugged yet inexpensive construction that can be produced in mass quantities at a relatively low cost, preferably by plastic molding techniques, and which requires no separate metal components, all of which would require additional material costs and fabrication expenses.

The closest known prior art security container to that of the present invention provides for a dual linear sliding motion in which a slide plate moves along one end of the container and a separate locking tab moves linearly across the access opening perpendicular to the linear sliding movement of the slide plate. However, the locking tab is slidably mounted on a molded post and uses a coil spring to bias it toward the closed locked position. Furthermore, each of the slide plate and locking tab must be moved individually for opening and closing the access opening thereby increasing the amount of manipulation required for utilizing the security container.

Therefore, the need exists for an improved storage container, preferably formed of an inexpensive lightweight plastic, which can be used to hold a variety of articles such as audio and video cassettes, electronic games, software and other recorded media, which has an access opening at one end of the container and which has a tab that is movable into and out of blocking engagement by a single action motion, and which is provided with a locking mechanism operated by a key or other similar unlocking device. There is no such security container of which I am aware which accomplishes these results.

SUMMARY OF THE INVENTION

Objectives of the invention include providing an improved security container which is formed of a lightweight molded plastic, which can be mass produced relatively inexpensively, and which is provided with a rigid locking tab which blocks the access opening of the container to prevent removal of the stored article therefrom and an associated slide plate which is moved between the locked and unlocked positions by a single motion, wherein the slide plate and locking tab both move in unison in linear directions perpendicular to each other.

Another objective of the invention is to provide such a security container which provides protection for an E.A.S. tag that can be attached to various inside surfaces of the container to prevent theft until the article is removed at a check-out counter by a retail clerk.

Still another objective of the invention is to provide such a security container which can be mass produced relatively inexpensively by plastic molding procedures, which preferably is of a transparent plastic material to enable the contents to be readily visible, which provides both physical and theft protection to an article stored within the container, and which includes a frame that generally conforms to the shape and size of the stored article thereby reducing the overall size of the container to permit a relatively large volume of the containers to be displayed in a usual storage and display rack.

These objectives and advantages are obtained by the improved security container of the present invention, the general nature of which may be stated as including a generally parallelipipedic frame which forms a storage chamber that has an access opening at one end for inserting and removing an object into and from the storage chamber; locking means mounted on the frame for selectively blocking and unblocking the access opening, said locking means including a slide plate linearly slidably mounted on said frame and movable toward and away from the access opening and a tab movably mounted on the frame adjacent the access opening and movable linearly between a locked position where it blocks the access opening preventing removal of the object and a retracted unlocked position, said linear movement of the tab being substantially perpendicular to the linear movement of the slide plate; and actuation means operatively engageable between the lock plate and lock tab for automatically moving the lock tab between the locked and unlocked positions as the slide plate moves along the frame.

BRIEF DESCRIPTION OF THE DRAWINGS

A preferred embodiment of the invention, illustrative of the best mode in which applicant has contemplated applying the principles, is set forth in the following description and is shown in the drawings and is particularly and distinctly pointed out and set forth in the appended claims.

FIG. 1 is a perspective view of the new security container shown holding a double CD jewel box;

FIG. 2 is an enlarged fragmentary perspective view of the upper end portion of the security container with the slide lock removed therefrom;

FIG. 2A is a fragmentary perspective view of the end portion of the security container as shown in FIG. 1, showing a modified mounting arrangement of the locking tab;

FIG. 3 is a perspective view of the underside portion of the slide lock removed from the security container of FIG. 1;

FIG. 3A is an enlarged fragmentary sectional view taken on line 3A—3A, FIG. 3;

FIG. 3B is an enlarged fragmentary section view taken on line 3B—3B, FIG. 3;

FIG. 4 is a greatly enlarged perspective view of the locking tab removed from the security container of FIG. 1;

FIG. 5 is a sectional view through the upper portion of FIG. 1 with the slide lock of FIG. 3 and the locking tab of FIG. 4 in an open unlocked position;

FIG. 6 is a sectional view similar to FIG. 5 showing the slide lock and locking tab in a closed locked position;

FIG. 13 is a perspective view of one type of key which can be used for unlocking the security container.

Similar numerals refer to similar parts throughout the drawings.

DESCRIPTION OF THE PREFERRED EMBODIMENT

Figure 7:
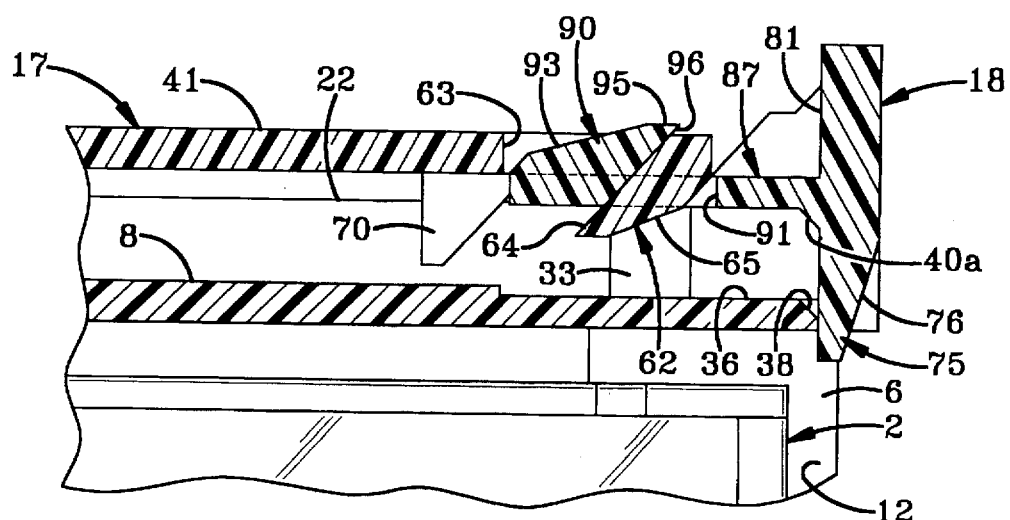
FIG. 7 is an enlarged fragmentary sectional view taken on line 7—7, FIG. 5, with the slide lock and locking tab in open position.
Figure 8:
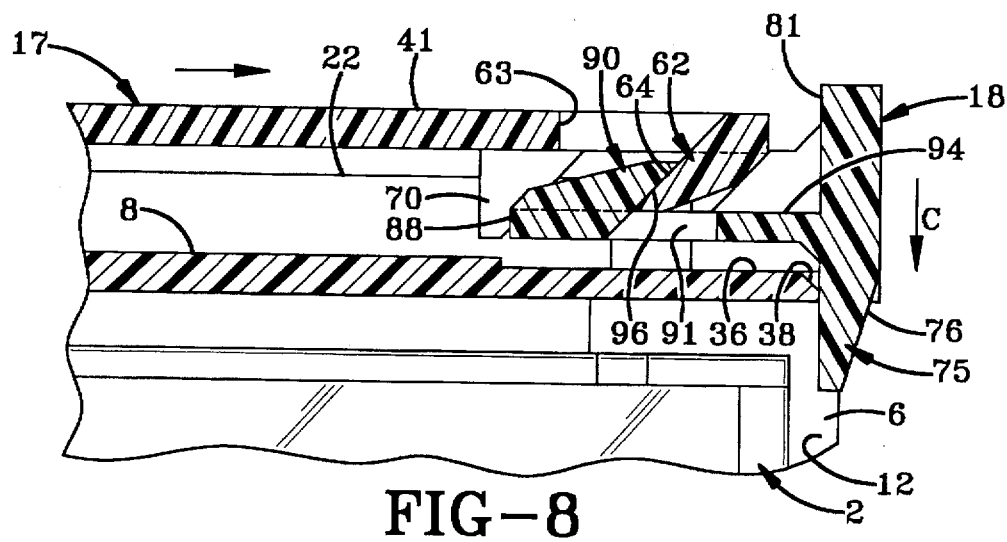
FIG. 8 is a view similar to FIG. 7 showing the slide lock and locking tab when moving from the open position toward the closed position.

The storage container of the present invention is indicated generally at 1, and is shown in FIG. 1 in a closed position, with a dual CD package 2 being secured therein. Although a dual CD package 2 is shown in the drawing and discussed below, container 1 can store a variety of objects and is intended primarily for recorded media such as VHS cassettes, audio cassettes, electronic games and other types of software packages usually on discs, which usually are contained within a separate storage case, such as jewel boxes. Container 1 includes a frame indicated generally at 4, which is molded of a preferably transparent plastic material such as polycarbonate, and has a parallelepepedic configuration with a pair of spaced parallel sidewalls 5 and 6, a rear wall 7, and spaced parallel end walls 8 and 9. Walls 5–9 form an interior storage chamber or compartment 10, for receiving and storing an article which is inserted into and removed from the compartment through an elongated end access opening 12. Opening 12 extends generally throughout the longitudinal length defined by walls 5 and 6, as well as the transverse length defined by end walls 8 and 9. An enlarged opening 13 may be formed in each of the sidewalls 5 and 6, as well as corner openings 14, to reduce the material cost and weight of the container, as well as providing better viewing of the article stored therein.

In accordance with the invention, a unique locking mechanism indicated generally at 15, is mounted on frame 4 and movable between locked and unlocked positions to prevents removal of an article from within the storage container when in the locked position by blocking a portion of access opening 12, and which provides complete access into compartment 10 through opening 12 when in the unlocked position. This locking mechanism is best seen in FIGS. 2, 3 and 4 which shows the principle components of the locking mechanism, namely a slide plate indicated generally at 17, shown in an upside position in FIG. 3, a lock tab indicated generally at 18 (FIG. 4), and a slide mounting channel arrangement indicated generally at 20 (FIG. 2).

Referring to FIG. 2, the slide channel arrangement 20 preferably is formed of the same plastic material as is frame 4 and integrally therewith and extends generally throughout the longitudinal length of end wall 8. Channel arrangement 20 includes a pair of spaced generally parallel slide rails 22, each of which includes a pair of notches 23 at spaced intervals to enable slide plate 17 to be mounted thereon as described in further detail below. Slide rails 22 are formed with outer undercuts 25 which provide a pair of spaced slide channels for slidably receiving and mounting slide plate 17 thereon.

A plurality of angled, preferably flexible projections or fingers 26 are formed on rails 22 and extend inwardly therefrom and form a gap or space 27 between their outer free ends for slidably receiving therein the locking projections of slide plate 17 as described more fully below. A pair of rectangular post-like members 29 are formed on the ends of slide rails 22 adjacent access opening 12. A slide channel or slot 30 is formed on an inner surface 31 of each post 29 and extend parallel to each other in the same direction as is the longitudinal length of access opening 12. A pair of rectangular shaped projections 33 are formed opposite of each other on inner surface 31 of rails 22 and are spaced slightly rearwardly of posts 29. These projections fit within cutouts 44 formed in lock tab 18.

Still referring to FIG. 2, end wall 8 extends generally throughout the length of frame 4 but may have an open area 35 adjacent projections 26 and has a lower stepped outermost end surface 36 adjacent access opening 12, which extends beyond projections 33. Three tapered notches 38 are formed in the outer edge 40 of stepped end surface 36 which engage and slide along tapered surfaces 40 of lock plate 18.

Slide plate 17 (FIG. 3) preferably is molded of a plastic material similar to frame 4 but as a separate component, and is shown in FIG. 3 in an inverted position in order to show the operating features thereof. Slide plate 17 includes a main top wall 41 which extends generally throughout the entire length of the slide plate and a pair of spaced parallel sidewalls 42 and an end wall 43. Two pairs of spaced parallel slide rails or projections 45 are formed adjacent the outer edges of sidewalls 42 and extend inwardly toward each other and are complementary in shape and size to notches 23 formed in slide rails 22 as shown in FIG. 2, for mounting slide plate 17 on frame 4. When slide plate 17 is mounted on frame 4, rails 45 are trapped within undercuts 25 of slide rails 22 to provide both the means for retaining slide plate 17 on frame 4 as well as the sliding connection therebetween to permit slide rails 17 to move linearly along frame 4 between the locked and unlocked positions as described more fully below.

A pair of parallel locking rails 48 are formed on the inside surface of top wall 41 of slide plate 17 and are formed with a plurality of angled locking projections 49 which engage the outer ends of flexible projections 26 of slide channel 20 as shown in FIG. 6, to retain slide plate 17 in the locked position. A plurality of key access holes 50 are formed through top wall 41 and are located adjacent each locking rail 48 so that when the tangs 53 of a usual key 54 (FIG. 13) are inserted therein, they will engage flexible projections 26 and move the same out of engagement with locking projections 49 to permit slide plate 17 to move from the locked position of FIG. 6 to an unlocked position of FIG. 5. This type of mating locking projections, some of which are flexible, which are moved out of engagement by the tangs of a key, are well known in the art and could be replaced with other types of locking and unlocking mechanisms including a magnetic actuated locking device.

A pair of spaced projections, each of which is indicated generally at 56, are formed integrally on wall 41 of slide plate 17 and adjacent front edge 57 thereof. Each projection 56 includes a flat upper surface 58 which is generally parallel to wall 41 and a sloped front surface 59 which extends between top surface 58 and slide plate edge 57. Flat top surface 58 is connected to top wall 41 by a vertically extending end surface 60 (FIG. 3B).

Another projection indicated generally at 62, is located centrally between spaced projections 56 and just forwardly of a generally rectangular shaped opening 63 formed in top wall 41. Center projection 62 includes a sloped rear camming rear surface 64 and a tapered sloped front surface 65. Center projection 62 preferably is formed integrally with and of the same plastic material as slide plate 17 (FIG. 3A).

A second pair of projections each of which is indicated generally at 70, is located in longitudinal alignment with projections 56 and spaced rearwardly therefrom as shown in FIG. 3B and include a sloped front surface 71, a flat top surface 72 and a vertically extending rear surface 73. The functions of projections 56, 62 and 70 are described in greater detail below and in particular their cooperation with the various surfaces and projections formed on lock tab 18.

Referring to FIG. 4, lock tab 18 includes a main locking panel 75 which has a generally rectangular flat shape except for a tapered front area 76. The side edges of locking panel 75 are formed with two stepped shoulders 77 which form a pair of linear longitudinally extending slide rails 78. A pair of spaced projections each of which is indicated generally at 80, extend rearwardly from the flat back surface 81 of locking panel 75. Projections 80 are similar to each other each of which includes a tapered sloped camming surface 82 which terminates in a flat surface 83 which merges into flat back surface 81 by another angled surface 84.

A flat somewhat rectangular control plate indicated generally at 87, extends rearwardly generally from the center of flat back surface 81 and perpendicular thereto, between projections 80. Control plate 87 includes a rear edge 88 which is formed with two sloped end camming surfaces 89. A return projection indicated generally at 90, is formed integrally with control plate 87 and extends toward locking panel 75 from rear edge 88 terminating adjacent an opening 91 which is formed through control plate 87. Return projection 90 includes a top surface 93 which is sloped upwardly from the flat top surface 94 of control plate 87 toward locking panel 75. Return projection 90 further includes a small flat surface 95 and a sloped angled front surface 96 which extends from above opening 91 between flat top surface 95 and surface 94 of control plate 87.

As shown in dash lines and indicated at 55, an E.A.S. tag could be mounted in a variety of safe concealed positions within container 1 such as on the inside surface of sidewall 5 (FIG. 1), on end wall 8 (FIG. 2), or on the inner surface of wall 41 of slide plate 17 (FIG. 3). This provides the retailer with flexibility as to where it wishes to place an E.A.S. tag or other security device which could depend upon the particular tag used.

Figure 9:
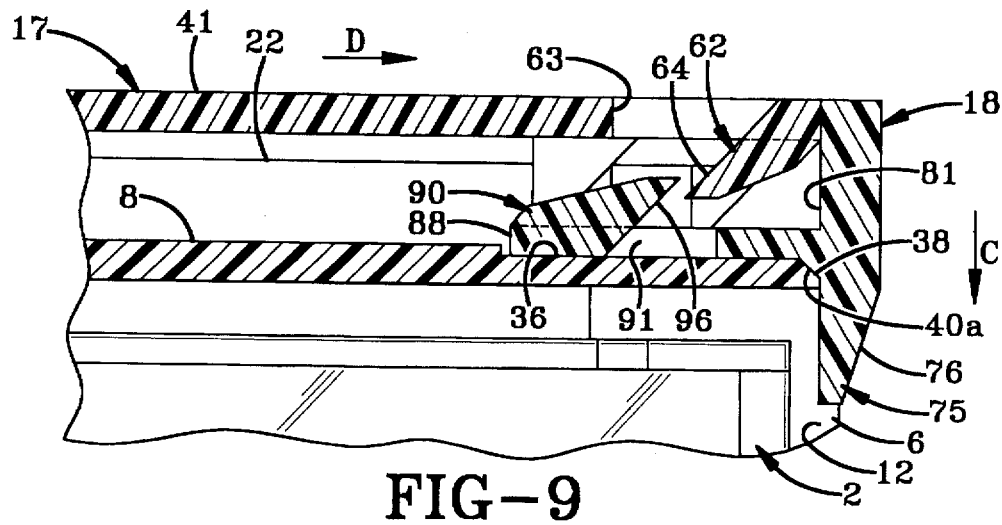
FIG. 9 is a view similar to FIGS. 7 and 8 showing the slide lock and locking tab in the closed locked position.
Figure 12:
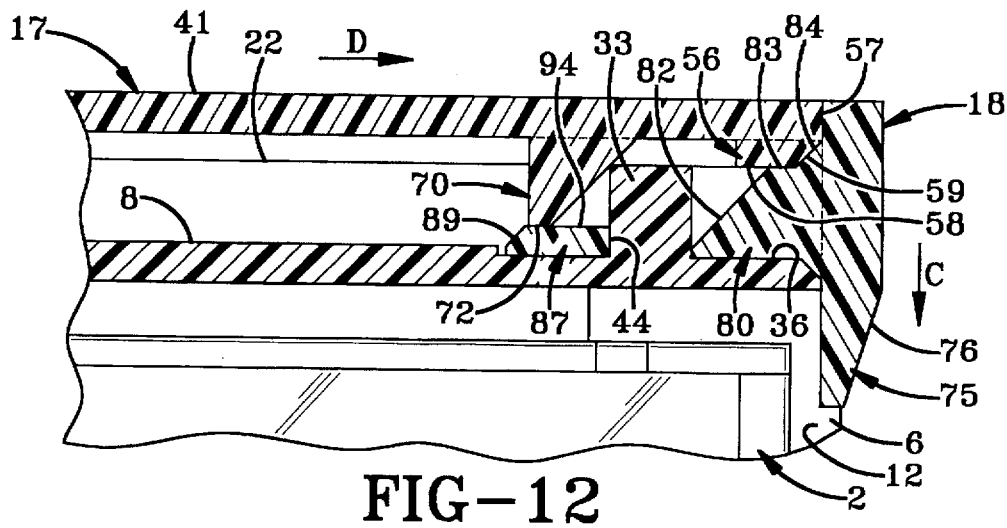

The operation of security container 1 is illustrated in FIGS. 5–12. FIG. 5 shows the security container in the unlocked position wherein slide plate 17 is moved away from access opening 12 in the direction of arrow A in which position, locking tab 18 is in the position shown in FIGS. 7 and 10 where it provides complete access through opening 12. FIG. 6 shows slide plate 17 being moved to the right in the direction of arrow B to the closed position in which position locking tab 18 extends over the access opening preventing the removal of the recorded media therefrom as shown in FIGS. 9 and 12.

After dual CD package 2 is placed in storage chamber 10 through access opening 12, slide plate 17 is moved from the position of FIG. 5 to that of FIG. 6 which movement is shown in further detail in FIGS. 7–12. Upon forward movement of slide plate 17 toward the closed position, sloped front surfaces 59 of spaced projections 56 slidably engage and move along sloped camming surfaces 82 of locking tab projections 80 as shown particularly in FIGS. 10 and 11 which automatically moves locking tab 18 in a linear downward direction as shown by arrow C (FIG. 11) until it reaches the locked position as shown in FIG. 12. Locking tab 18 moves linearly by the sliding engagement of slide rails 78 within slide channels 30. Upon locking tab 18 reaching the locked position of FIG. 12, the lower end of locking panel 75 extends across a portion of access opening 12 blocking the removal of package 2 therefrom. Locking projections 49 of locking rails 48 pass beyond the free ends of flexible projections 26 as shown in FIG. 6, preventing slide plate 17 from moving in the direction opposite to that of arrow B in FIG. 6. When in the locked position, locking tab 18 is prevented from moving upwardly in a direction opposite to that of arrow C by flat top surfaces 58 of projections 56 engaging flat surfaces 83 of projections 80 (FIG. 12), and by flat top surfaces 72 of locking projections 70 engaging flat top surface 94 of flat control plate 87. The linear sliding movement of tab 18 in a single vertical plane is also controlled by tab cutouts 44 and slide plate projections 33.

Thus, when slide plate 17 is in the locked position and secured therein by flexible projections 26 and projections 49, locking tab 18 is retained in the locked position by the surface engagements described above. Again, in accordance with one of the main features and advantages of the invention, the sliding movement of slide plate 18 from the unlocked to the locked position will automatically move lock tab 18 from its unlocked to its locked position by the sliding and camming engagement of the various projections as discussed above.

Figure 10:
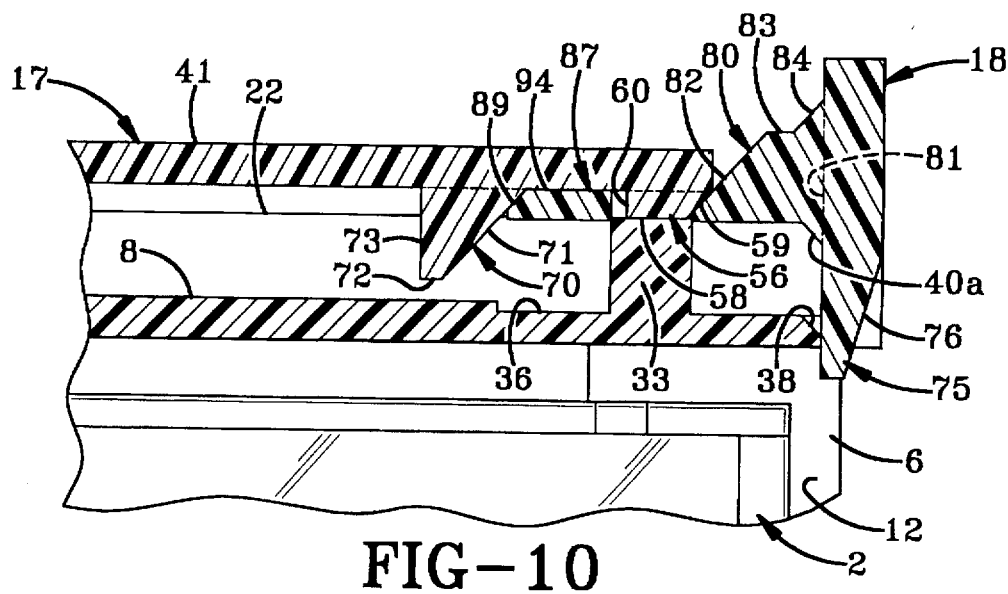
FIG. 10 is an enlarged fragmentary sectional view taken on line 10—10, FIG. 5, showing the slide lock and locking tab in open position.
Figure 11:
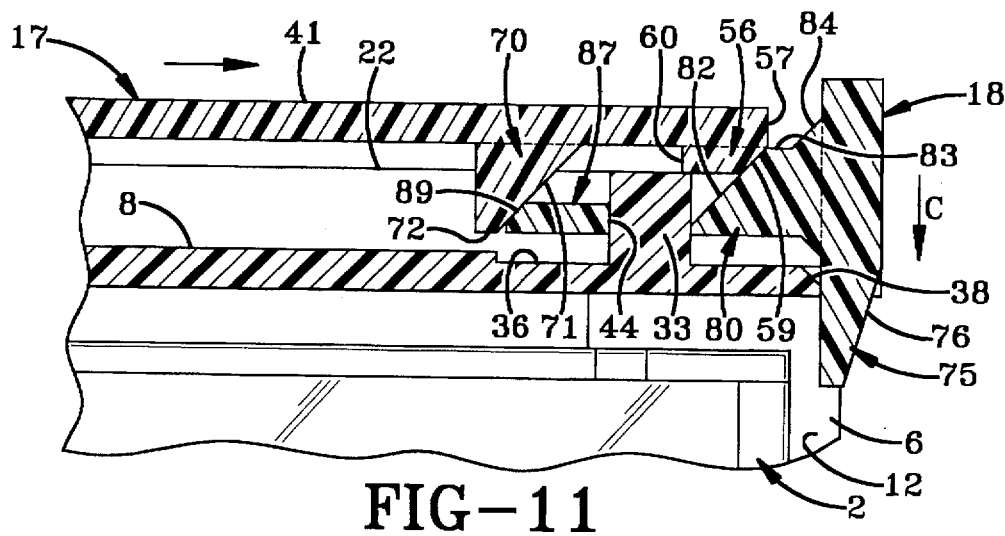
FIGS. 11 and 12 are views similar to FIG. 10 showing the slide lock and locking tab moving through an intermediate position to the locked position.

To unlock and unblock access opening 12, tangs 53 of key 54 are inserted through holes 50 which will move flexible projections 26 out of engagement with locking rail projections 49 enabling the slide plate to be manually moved rearwardly from its locked position of FIGS. 6, 9 and 12 to the unlocked positions of FIGS. 5, 7 and 10. Furthermore, in accordance with one of the main features of the invention, the rearward sliding movement of slide plate 17 will automatically move locking tab 18 from its locked blocking position to its unlocked unblocking position of FIGS. 7 and 10. This automatic movement of tab 18 is achieved by sloped rear surface 64 of center projection 62 of slide plate 17 cammingly engaging sloped camming surface 96 of return projection 90 of locking tab 18, which due to the sliding camming engagement between the two surfaces, will automatically move locking tab 18 in a linear upward direction opposite to that of arrow C, simultaneously with the rearward movement of slide plate 17 in a direction opposite to that of arrow D. Center projection 62 of slide plate 17 is in the area between return projection 90 and flat back surface 81 of locking panel 75 and extends into hole 91 of tab 18 when slide plate 17 is operatively engaging and moving tab from its unlocked to locked position and forms no function until it engages return projection 90 to move tab 18 to its unlocked position.

Therefore, in accordance with the invention, the linear movement of slide plate 17 along one end of frame 4 will automatically move locking tab 18 linearly in a direction perpendicular to that of the slide plate between locked and unlocked positions. This coordinated movement between slide plate 17 and tab 18 avoids the retail clerk from independently operating the locking tab and slide plate as is required in certain of the prior art security containers, such as described in the background portion of this specification. Although the linear movement of tab 18 is relatively small, less than one-half, it is sufficient to extend over the end of access opening 12 blocking removal of package 2 therefrom since package 2 will have a size and configuration complementary to that of storage chamber 10 in order for tab 18 to prevent its removal. Also, movement of tab 18 and slide plate 17 only in the linear directions and free of any pivotal movements enables the two members to be protected within their respective slide channels eliminating projecting parts that are subject to breakage.

Container 1 therefore requires only three separate components which can be molded relatively inexpensive and mass produced of a plastic material, which are then snap-fitted together. Once the three components are assembled, they remain connected together so that the individual parts are not subject to loss since container 1 can be loaded and unloaded and reused by a retail establishment for numerous sales.

FIG. 2A shows a very slight modification of the linear sliding connection of tab 18 on post members 29. In this configuration, the slide rails are formed on posts 29 and extend inwardly to each other and are slidably received within slide channels formed in tab 18, which is the reverse of that shown in FIGS. 1 and 2.

Although the particular projections and camming surfaces described above and shown in the drawings which are formed on slide plate 17 and tab 18 and are mutually engaged with each other to provide for the automatic linear movement of tab 18 in response to the linear movement of slide plate 17 have been developed for smooth operation of the security container, other projections and camming surfaces could be utilized which could achieve the same result. Thus the invention need not be limited to the exact camming surface and projection arrangement shown in the drawings and described above.

Accordingly, the improved security container is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purpose and are intended to be broadly construed.

Moreover, the description and illustration of the invention is by way of example, and the scope of the invention is not limited to the exact details shown or described.

Having now described the features, discoveries and principles of the invention, the manner in which the improved security container is constructed and used, the characteristics of the construction, and the advantageous, new and useful results obtained, the new and useful structures, devices, elements, arrangements, parts and combinations, are set forth in the appended claims.

We claim:

1. A security container for holding an object including:
   a generally parallelipipedic frame forming a storage chamber and having an access opening at one end for inserting and removing the object into and from said storage chamber;
   locking means mounted on the frame for selectively blocking and unblocking the access opening, said locking means including a slide plate linearly slidably mounted on said frame and movable toward and away from the access opening and a lock tab movably mounted on the frame adjacent the access opening and movable linearly between a locked position where it blocks the access opening preventing removal of the object and a retracted unlocked position, said linear movement of the tab being substantially perpendicular to the linear movement of the slide plate; and
   actuation means operatively engageable between the slide plate and lock tab for automatically moving the lock tab between the locked and unlocked positions as the slide plate moves along the frame.

2. The container defined in claim 1 in which the locking means further includes a lock mechanism which releasably secures the slide plate in a locked position.

3. The container defined in claim 2 in which a slide channel is formed on the frame; and in which the slide plate is slidably received in and moves along said channel.

4. The container defined in claim 3 in which the slide channel is formed by a pair of spaced parallel slide rails; and in which the slide plate includes a pair of spaced parallel slide projections which slidably engage said slide rails.

5. The container defined in claim 2 in which the lock mechanism includes mutually engageable projections formed on the frame and slide plate to releasably secure the slide plate in the locked position.

6. The container defined in claim 5 including key means for disengaging the projections to permit the slide plate to move from the locked position toward an unlocked position.

7. The container defined in claim 6 in which the key means includes a key having a plurality of tangs; and in which openings are formed in the slide plate for receiving said tangs therein for operative engagement with certain of the projections.

8. The container defined in claim 2 in which a slide channel is formed on the frame adjacent the access opening; and in which projections are formed on the tab and are slidably engaged in said channel to permit only linear movement of said tab when moving between the locked and unlocked positions.

9. The container defined in claim 2 in which a pair of spaced slide projections are formed on the frame adjacent the access opening; and in which a slide channel is formed in the tab and slidably receives the slide projections therein to permit only linear movement of said tab when moving between the locked and unlocked positions.

10. The container defined in claim 1 in which the actuation means includes a first camming surface formed on the lock tab and a second camming surface formed on the slide plate wherein said first and second camming surfaces engage each other upon movement of the slide plate toward the access opening to move the lock tab linearly across the access opening.

11. The container defined in claim 10 in which the actuation means further includes a third camming surface formed on the lock tab and a fourth camming surface formed on the slide plate wherein said third and fourth camming surfaces engage each other upon movement of the slide plate away from the access opening to move the lock tab linearly away from the access opening toward the unlocked position.

12. The container defined in claim 1 in combination with the object, said object being a box containing a recorded media; and in which the storage chamber is complimentary in shape and size to said box.

13. The container defined in claim 1 in which the security container is formed of only three separate components, said frame, slide plate and lock tabs each of which is a separate one piece member formed of plastic.

14. The container defined in claim 13 in which the actuation means includes a plurality of camming surfaces formed integrally on the slide lock and lock tab.

15. A container adapted to contain at least one article, which container has an access opening whereby said article can be inserted into or removed from the container, the container being provided with a retention mechanism adapted to retain the article within the container, said retention mechanism including:

a blocking member located adjacent the access opening and movable linearly between a blocking position over a portion of said opening to block removal of the article and an unblocking position where it permits removal of the article; and a sliding member movable linearly between first and second positions, said sliding member operatively engaging the blocking member to move said blocking member between the blocking and unblocking positions and to selectively retain said blocking member in said positions, wherein said linear movement of the blocking member is substantially perpendicular to the linear movement of the sliding member.

16. The container defined in claim 15 including camming surfaces on the blocking member and sliding member which are engageable with each other to effect the linear movement of the blocking member in direct response to the linear movement of the sliding member.

17. The container defined in claim 15 including lock means for locking the sliding member in the second position which retains the blocking member in the blocking position.

18. The container defined in claim 17 further including key means for operatively engaging the lock means.

19. The container defined in claim 15 including slide channels extending perpendicular with respect to each other for slidably receiving a respective one of the blocking member and sliding member thereon.

20. The container defined in claim 15 in which the sliding member extends substantially throughout the entire length of one side of the container.

* * * * *